United States Patent
Baranski (10) Patent No.: US 7,764,239 B2
(45) Date of Patent: Jul. 27, 2010

(54) ANTENNA PANE INCLUDING COATING HAVING STRIP-LIKE SEGMENTED SURFACE PORTION

(75) Inventor: Detlef Baranski, Recklinghausen (DE)

(73) Assignee: Pilkington Automotive Deutschland GmbH, Witten (DE)

( * ) Notice: Subject to any disclaimer, the term of this patent is extended or adjusted under 35 U.S.C. 154(b) by 793 days.

(21) Appl. No.: 10/528,195

(22) PCT Filed: Sep. 12, 2003

(86) PCT No.: PCT/EP03/10141

§ 371 (c)(1),
(2), (4) Date: Oct. 28, 2005

(87) PCT Pub. No.: WO2004/027923

PCT Pub. Date: Apr. 1, 2004

(65) Prior Publication Data

US 2006/0152421 A1    Jul. 13, 2006

(30) Foreign Application Priority Data

Sep. 17, 2002 (WO) ............... PCT/EP02/10399
Mar. 27, 2003 (DE) ............... 103 14 094

(51) Int. Cl.
*H01Q 1/32* (2006.01)
*H01Q 1/02* (2006.01)
(52) U.S. Cl. ..................... 343/713; 343/704
(58) Field of Classification Search ............ 343/711, 343/713, 704, 767, 712
See application file for complete search history.

(56) References Cited

U.S. PATENT DOCUMENTS

| | | | |
|---|---|---|---|
| 3,313,920 A | | 4/1967 | Gallez et al. |
| 4,459,470 A | | 7/1984 | Shlichta et al. |
| 4,827,274 A | | 5/1989 | Armbruster |
| 4,849,766 A | | 7/1989 | Inaba et al. |
| 5,012,255 A | | 4/1991 | Becker |
| 5,307,076 A | * | 4/1994 | Murakami et al. .......... 343/704 |
| 5,355,144 A | * | 10/1994 | Walton et al. ............... 343/713 |
| 5,898,407 A | * | 4/1999 | Paulus et al. ............... 343/713 |
| 6,239,757 B1 | * | 5/2001 | Ishikawa et al. ............ 343/711 |
| 2005/0035913 A1 | | 2/2005 | Baranski |

FOREIGN PATENT DOCUMENTS

| | | |
|---|---|---|
| DE | 1 540 764 | 9/1969 |
| DE | 36 44 297 A1 | 7/1987 |
| DE | 37 21 934 A1 | 1/1988 |
| DE | 36 41 738 A1 | 6/1988 |
| DE | 195 08 042 A1 | 10/1995 |

(Continued)

*Primary Examiner*—Hoang V Nguyen
*Assistant Examiner*—Robert Karacsony
(74) *Attorney, Agent, or Firm*—Buchanan Ingersoll & Rooney PC (57) ABSTRACT

An antenna pane for use, for example, as a vehicle window, comprises a glass pane (1) carrying an electrically conductive coating (3). The coating (3) includes a strip-like portion (5) divided into electrically isolated segments by barrier lines (4) spaced so the coating transmits HF radiation in a specified frequency range and constructed, by contacting in contact areas (7) at its two longitudinal sides (6) and by its outer dimensions, as a slot antenna for frequencies in said range.

20 Claims, 10 Drawing Sheets

FOREIGN PATENT DOCUMENTS

| | | |
|---|---|---|
| DE | 195 13 263 A1 | 10/1996 |
| DE | 101 46 439 C1 | 11/2002 |
| EP | 0 332 898 B1 | 9/1989 |
| EP | 0 531 734 A1 | 3/1993 |
| EP | 0 717 459 A1 | 6/1996 |
| EP | 0 760 537 B1 | 3/1997 |
| EP | 0 899 811 A2 | 3/1999 |
| GB | 2 186 769 A | 8/1987 |
| JP | 62-193304 | 8/1987 |
| WO | 96/31918 | 10/1996 |
| WO | WO0182410 A1 * | 11/2001 |
| WO | 03/028151 A1 | 4/2003 |

* cited by examiner

ANTENNA PANE INCLUDING COATING HAVING STRIP-LIKE SEGMENTED SURFACE PORTION

The invention concerns an antenna pane comprising at least one glass pane and at least one electrically conductive coating which is subdivided by barrier lines into a number of electrically isolated segments on which antenna pane the coating incorporates at least one strip-like segmented surface portion in which the distance between the barrier lines is so small that the coating there can transmit HF radiation in a specified frequency range.

Glass panes which are provided with electrically conductive coatings, particularly with solar control coatings, and on which the coating normally covers the greater part of the glass pane, have already been put to use in various ways as antenna panes, mainly, but not exclusively, as motor vehicle glass. Accordingly, it has been suggested that the conductive coating itself be used as a monopole-type antenna (e.g. DE 37 21 934 A1). It has also been suggested that the coating be subdivided into electrically isolated segments to optimise the antenna function (e.g. DE 36 41 738 A1, JP A 62-193 304). The opportunities for designing the antenna in this way are limited.

Antenna panes on which a strip-like, non-coated area in an electrically conductive coating or surrounding this can be used as a slot antenna are also known, e.g. from EP 0 332 898 B1 and EP 0 760 537 B1. An antenna pane with a number of slot antennas is described in DE 101 46 439 C1 held by the applicant.

It has been suggested as an alternative to direct utilisation of the electrically conductive coating for antenna purposes that the coating be provided full-surface or partly with a raster of non-conductive barrier lines to enable it to transmit HF radiation and thereby separate antennas arranged behind the coating, viewed from the transmitter's point of view, to be used (e.g. EP 0 531 734 A1, DE 195 08 042 A1, EP 0 717 459 A1). The barrier lines are generated preferably by means of a laser and are so close together that they can transmit HF radiation with polarisation perpendicular to the run of the lines in a specified frequency range.

An antenna pane of this type on which the invention is based is found, for example, in WO 96/31918 A1. The strip-like segmented (rastered) surface portions suggested there, in which the distances between the barrier lines are so small that the coating there can transmit HF radiation, have the purpose of enabling separate antennas on which because of the segmentation the reception is not appreciably impaired by the electrically conductive coating to be arranged in the HF-transmitting areas thus formed. A disadvantage of this solution is that additional transmission lines are indispensable for the antenna function and accordingly the manufacture of the antenna panes becomes more complex and production costs are increased. This also runs contrary to the efforts made by the motor vehicle industry to keep the number of wire-type or printed conductors in the vision area of the panes as low as possible for the sake of the clearest possible view and of safety.

The invention is based on the problem of specifying an antenna pane with an electrically conductive coating which requires no additional printed or wire-type transmission lines and which can be rationally produced. The inventive measures are intended to impair the view through the pane as little as possible, offer the antenna expert great freedom of antenna design and enable the integration of antennas for different frequency ranges. At the same time it should be possible to easily integrate heating elements or other electrical functions into the antenna pane.

It is suggested in accordance with the invention that the segmented surface portion is by contacting in the contact areas at its two longitudinal sides and by its outer dimensions constructed as a slot antenna for electromagnetic radiation in the range of frequencies which the segmented surface portion can transmit.

This means by which a surface portion of the coating is made directly able to transmit HF radiation and so usable as an antenna, that is, as a slot antenna, by segmentation enables the coated pane to be provided surprisingly easily with a diversely optimisable antenna function. A suitable frequency range for which the slot antenna is designed, taking into consideration the usual dimensions of motor vehicle panes in the meter range, is particularly, but not exclusively, the VHF range (30-300 MHz).

The segmented surface portion is normally arranged completely inside the coating and thus enclosed by this on all sides. In this case for the slot antenna formed in accordance with the invention to function it is not absolutely necessary for the antenna pane to be surrounded by metal bodywork in the installed condition. It is however within the scope of the invention to provide for the segmented surface portion to be located directly at the edge of the pane so that the metal bodywork at least along one (longer) side of the segmented surface portion acts as a metal surround for the slot antenna formed by this and is incorporated into the antenna function.

As regards the preferred width of the barrier lines and the maximum barrier line distance required for HF-transmissibility reference is made to the aforementioned publications (EP 0 531 734 A1, DE 195 08 042 A1, EP 0 717 459A1). HF-transmissibility as envisaged by the invention is achieved if the transmissibility for the specified frequency range is at least about 50%. Expressed in another way, this means that the attenuation caused to incident HF radiation by the coating in the segmented surface portion is not more than about 3 dB in the specified frequency range.

It goes without saying that particularly when barrier lines are provided for in the vision area of the antenna pane, their width should be kept as narrow as possible. The lower limit of the line width here is determined by the need to prevent short circuiting between adjacent segments as far as possible to prevent impairment of the antenna function and undesirable current flows. A barrier line width of about 0.05-0.1 mm has proved effective in practice. To achieve sufficient HF-transmissibility, the distances between barrier lines in the direction of polarisation should be considerably less than a fifth and preferably considerably less than a tenth of the relevant wavelength.

In an initial, particularly simple embodiment of the invention from the production point of view it is provided for that the barrier lines within the segmented surface portion form a linear or lattice raster with a constant raster unit size.

A further optimisation of the antenna function, on the one hand, and a reduction of the processing time for generating the barrier lines, on the other, enables another preferred variant in which the barrier lines within the segmented surface portion form a raster with a variable raster unit size, variable barrier line width or variable raster form. It has been found that the raster unit size formed by the barrier lines in the end areas of the segmented surface portion used as a slot antenna may, if necessary, be larger than in its central area, in which contacting normally takes place. Here it is taken into account that the field amplitude inside a slot antenna is at its greatest in the middle (antinode) and at its lowest at the ends (oscillation nodes). This enables the overall length of the barrier lines, by contrast with a variant with constant raster unit size, to be reduced without having to suffer a loss of antenna power. It is also possible to vary the barrier line width or above all the raster form and so achieve antenna optimisation or reduction of the production time. Accordingly the segmented surface portion used as a slot antenna will normally be segmented in the form of a lattice raster; here in particular rectangular and above all square rasters have proved effective for achieving HF-transmissibility for all directions of polarisation. However, depending on the contour of the strip-like segmented surface portion and the direction of polarisation of the HF-radiation to be received by the slot antenna, it can suffice to generate merely a linear raster in some areas.

It is within the scope of the invention instead of straight barrier lines to use undulating, curved, zigzagged, fractal or other non-rectilinear barrier lines. This enables, for example, a higher slot antenna bandwidth or special optical effects to be achieved.

An antenna pane optimised for multi-range reception is distinguished in that the segmented surface portion is designed as a slot antenna for the VHF range, that in a part of the segmented surface portion a raster which can transmit frequencies above the VHF range and is finer than in other areas of the segmented surface portion is provided for and that in this part at least one antenna is arranged for frequencies above the VHF range. The antenna for higher frequencies can be arranged as a separate antenna, if necessary, in another plane of the pane. Preferably, however, it is also generated directly from the coating with the aid of barrier lines.

This is achieved particularly easily if the segmented surface portion incorporates a constriction reducing the width of the segmented surface portion in the area in which it is contacted as a slot antenna. In the case of this embodiment it is not only the contacting of the slot antenna which is facilitated. If the constriction also comprises a strip of the electrically conductive coating projecting into the segmented surface portion, which is designed as a monopole or dipole antenna for one frequency range or more than one frequency band above the reception range of the slot antenna, additional transmission lines can be dispensed with for this frequency range. As regards the form of the monopole or dipole isolated from the coating, for example, arrangements known principally from DE 101 46 439 C1 or other forms familiar to the expert can be used.

It goes without saying that the antenna pane, as well as higher-frequency antennas which are preferably integrated into the segmented surface portion, can also incorporate lower-frequency antennas, particularly for the AM band. These can, as is known, be arranged as separate antennas in an HF-transmitting area or before or behind this. It is however also possible, and preferable within the scope of the invention, to isolate a sufficiently large area of the coating from the rest of the coating by barrier lines and wire it as an AM antenna; here care must be taken to isolate electrically from the AM antenna areas of the coating close to the bodywork in the installed condition in order to prevent coupling of the AM antenna to the bodywork and so reducing the antenna output.

The antenna pane can easily be functionally extended to form a heatable antenna pane, if the coating comprises a heatable area provided with bus bars and electrically isolated by at least one barrier line from the area of the pane adjacent to the segmented surface portion. Here it can be provided for that the heatable area is provided with barrier lines which influence the distribution of the heating current. Such an arrangement is especially advantageous from the production point of view, since—except for the antenna contacts or bus bars required for the heating and antenna function—no additional conductors are required to provide the heating function. Rather it is sufficient merely to incorporate some further barrier lines into the coating in addition to the barrier lines provided for the antenna function in accordance with the invention. With the aid of these further barrier lines, on the one hand, a heatable area is generated from the coating and electrically isolated from the area used for antenna purposes with its segmented surface portion and, on the other, the heatable area can, if desired or necessary, be provided in a known way (e.g. U.S. Pat. No. 4,459,470 A1, DE 15 40 764 A1, DE 36 44 297 A1) with barrier lines so as to enable local overheating to be prevented or a particular local distribution of the heating effect to be achieved.

If in addition to the slot antenna according to the invention further antennas are to be integrated into the heatable antenna pane, it can particularly be provided for that the heatable area is used in a known way as an antenna for the VHF and/or AM range. It is also possible with the aid of barrier lines to generate directly in the coating additional antenna structures for high-frequency antennas, such as GPS antennas or antennas for electronic key systems (keyless entry), passive switching elements such as capacitances or inductances, feed conductors and the like.

Even if the invention aims as far as possible to avoid additional antennas or heating conductors, it is nevertheless within its scope to provide for such additional conductors as required, if, for example, the heating effect of the electrically conductive coating is insufficient or the antenna function is to be further optimised or a multi-band and/or diversity reception is to be enabled. Such additional conductors can be provided for directly on the coating and in contact with it or set at a distance from it, particularly in another plane of the pane. Here the coating will have to be generally segmented in a known way in the area of additional antenna conductors to produce HF-transmissibility. Even if it increases the cost of manufacture, the strip-like segmented surface portion can within the scope of the invention be surrounded, as required, with additional conductors or (virtual) ground conductors be provided for at the edge of the pane, as is known from DE 101 46 439 C1, in order to optimise the antenna function.

The slot antenna formed from the segmented surface portion and also any further antennas can be contacted in a known way either by electric contact with the conductive boundary of the segmented surface portion or via a capacitive or inductive coupling to this. The latter variant is especially effective if the antenna pane is designed as a laminated glass pane and the coating is arranged within the laminated glass. The electrically conductive coating will then be located either on one of the inner surfaces of the glass panes or on a (PET) base film. When contacting the slot antenna and also other antennas or any further electrical elements of the antenna pane suitable measures must be taken to ensure that the contact or connecting conductors do not cross the slot in such a way as to undesirably short-circuit this (see DE 101 46 439 C1 and the PCT application with file reference PCT/EP02/10399).

Any heatable area provided for must be contacted in the usual way electrically with the aid of highly conductive bus bars consisting, for example, of printed and baked silver frit, copper strips, if necessary, bonded on with conductive adhesive, or the like.

Further electrical elements such as passive switching elements, feed conductors, amplifiers, sensors and the like can be alternatively or additionally incorporated on or in the antenna pane in accordance with the invention. Here within the scope of the invention it is also preferred to generate the further electrical elements from the electrically conductive coating as far as possible with the aid of barrier lines to enable fitting of additional conductor structures in or on the antenna pane to be extensively dispensed with.

The barrier lines required for realisation of the invention are very preferably generated by means of laser technology. Here the coating can be treated both on the not yet finally further-processed coated glass pane or coated film and after their being processed to a monolithic or a laminated end product such as laminated safety glass. Here YAG lasers have proved particularly effective. Local (electro)chemical processing, electroerosion or maskings are also suitable, but these are normally more expensive and less versatile.

The electrically conductive coating will normally cover essentially the whole of the antenna pane surface, particularly if it is used for solar control purposes or as a low E-coating. Here, however, it can be provided for that individual areas of the coating can be either blanked out by masking or the like when the coating is applied already or removed afterwards from areas of the surface. This is to be recommended particularly for invisible marginal areas of the coating to prevent corrosion or undesired capacitive coupling or short-circuiting of the coating to the metal bodywork. Such uncoated areas can, if necessary, be incorporated in a slot antenna comprising a segmented surface portion in accordance with the invention, thus further increasing construction and styling options.

Suitable electrically conductive coatings within the scope of the invention will have a surface resistance which is considerably below $\Omega/\square$ (ohms per square), particularly below about 10 $\Omega/\square$ and preferably below 5 $\Omega/\square$. For this purpose particularly coating systems with at lease one silver layer are suitable.

Any uncoated areas are for aesthetic reasons preferably optically masked with an opaque screen print or the like, which may be designed particularly broad-surface or as a partially transparent raster. A similar means can be provided for to at least partly optically mask the barrier lines and in particular the segmented surface portion used as a slot antenna, even if due to the small barrier line width this is not absolutely necessary within the scope of the invention.

The invention is explained in the following with the aid of some drawings. These show.

The Figures represent non-scale schematic drawings. The structures represented show projections in the plane of the drawing. In the case of real antenna panes individual structural elements can, as explained in the foregoing, also be arranged in different planes of the pane. A graphical representation of three-dimensional arrangements has been dispensed with for the sake of clarity. It goes without saying that in the case of motor vehicle antenna panes the specific conductor structures and barrier line arrangements must be designed and optimised to suit the section of bodywork available. The invention is explained with the aid of a motor vehicle antenna pane, although this should not be understood to mean that possible applications are limited to this. In the drawings identical reference numbers signify elements with identical functions. Where "horizontal" and "vertical" are used in the following, they refer to the schematic graphic representation with the antenna pane vertically aligned. It goes without saying that real antenna panes are usually installed in motor vehicles more or less at a considerable angle, thus enabling antennas of the antenna panes to normally receive horizontally and vertically polarised radiation.

Figure 1:
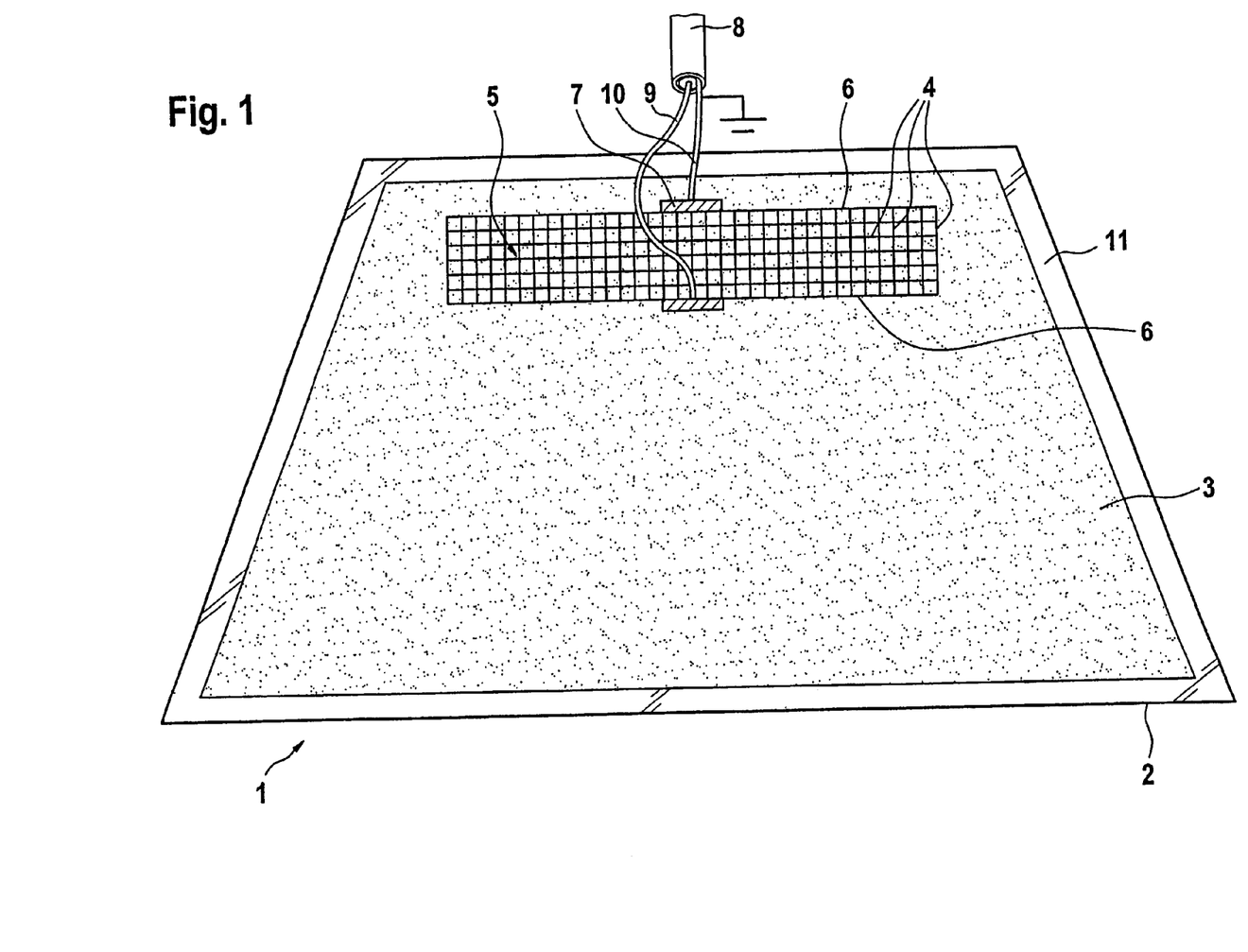
FIG. 1 a basic embodiment of the invention.

The antenna pane in FIG. 1, which represents a basic embodiment of the invention, comprises at least one glass pane 1 with an edge 2, here shown schematically as a trapezoid. The glass pane 1 can be of inorganic or organic glass. It is usually transparent. Not shown is the motor vehicle bodywork, which is at least partly of metal, entirely or partly surrounding the glass pane 1. On the glass pane 1 or a film attached to the glass pane 1 is an electrically conductive coating 3, which is indicated by fine dots. The electrically conductive coating 3 will usually also be transparent, enabling the glass pane 1 with the coating 3 together to offer a transparency higher than the legally prescribed minimum values. Towards the edge 2 of the pane an uncoated area 11—which within the scope of the invention is not absolutely essential—is provided for to prevent HF or DC short-circuiting of the coating 3 to the bodywork or to protect the coating 3 from corrosion.

Close to the upper edge 2 of the pane a horizontally arranged, strip-like, rectangular segmented surface portion 5 the boundaries and individual segments of which are produced by thin barrier lines 4 subsequently generated in the coating 3 by laser treatment or other means is provided for. As will be seen later, the segmented surface portion 5 need not always take the form of a slender rectangle, but can take various forms, particularly angular, U-shaped or arched, curved, annular or polygonal annular forms, depending on the requirement and the space available.

The width of the barrier lines 4 is made as small as possible to reduce impairment of vision, but large enough to reliably electrically separate the segments isolated by them. It will be typically about 0.05-0.1 mm. The barrier lines 4 inside the segmented surface portion 5 form a regular square raster over the entire surface portion 5, the size of the raster units of which is at least about one order of magnitude below the wavelength which the segmented surface portion 5 is to be able to transmit. It may even be helpful to use a raster in the area of only one hundredth of the wavelength.

Here, independently of the wavelength, in addition to the barrier lines 4 forming the edge boundaries of the segmented surface portion 5 at least one barrier line 4 must be provided for along the length of and within the segmented surface portion 5, since without such an interior barrier line 4 there is a danger of capacitive or even electric short-circuiting across the segmented surface portion 5 which may impair its function as a slot antenna. Preferably, however, within the scope of the invention several interior barrier lines 4 at least extending along the length of the segmented surface portion 5 are always provided.

Approximately in the middle of the longer sides 6 of the segmented surface portion 5 and above and below this merely schematically suggested strip-like contact areas 7 in which a connecting cable 8 can be connected HF-conductively to the electrically conductive coating 3 by its core 9 and its screening 10 are provided for. In the contact areas 7, as required, separate conductive connection surfaces can be provided for, particularly in the case of capacitive coupling to the coating 3. In the case of electrical coupling of the connecting cable 8 to the coating 3, on the other hand, the core 9 and the screening 10 can also be connected directly to the coating 3 by e.g. soldering, friction welding or by means of conductive adhesive without additional conductive connecting surfaces in the contact areas 7.

The segmented surface portion 5 constructed as a slot antenna for VHF radiation in the example of a windscreen or rear window pane shown has a length corresponding to about half the mean wavelength of the radiation to be received, taking into consideration the dielectric shortening factor of the glass pane 2. For a VHF frequency of 100 MHz, for example, the wavelength is about 3 m. With a shortening factor for glass panes of about 0.6-0.7 the optimum length of the segmented surface portion 5 for this frequency is thus about 1 m. Here for its function as a slot antenna deviations in the length of the segmented surface portion 5 from optimum λ/2 are even permitted, approximately in the range λ/4 to λ. Lengths of n*λ/2 (n=3, 5 etc.) are even possible. The width of the segmented surface portion 5 must always be considerably less than its length for its function as a slot antenna. While the reception bandwidth of a slot antenna increases as the width of its slot increases, its receptive power (signal-to-noise ratio) decreases for the mean frequency. It has been found that for the VHF range the width of the slot antenna and thus of the segmented surface portion 5 should not be appreciably below about 1 cm.

To function as a slot antenna, a closed HF circuit must be produced around the segmented surface portion 5 between the contact areas 7 on its longer sides 6. This may be produced particularly by surrounding the segmented surface portion 5 on all sides, as shown, with an unsegmented and electrically conductive area of the coating 3. The antenna function is not impaired, however, if there are capacitive or inductive breaks in the aforementioned HF circuit. Thus, if the segmented surface portion 5 is arranged close to the edge, the metal bodywork can also be incorporated into the HF circuit by capacitive coupling to the electrically conductive coating 3.

The core 9 of connecting cable 8 connected to the bottom longer side 6 of the segmented surface portion 5 must be arranged so that no short-circuiting of the slot antenna can occur in its connecting area. This can be achieved, for example, by running the core 9 at a sufficient distance from the segmented surface portion 5, that is, at least about 1 cm above or below the plane of the drawing (see PCT application PCT/EP02/10399).

The contact areas 7 need not necessarily be arranged in the longitudinal middle of the segmented surface portion 5. It may rather be preferable, particularly for reasons of impedance matching, to provide for the contact areas 7 to be located off centre.

Figure 2:
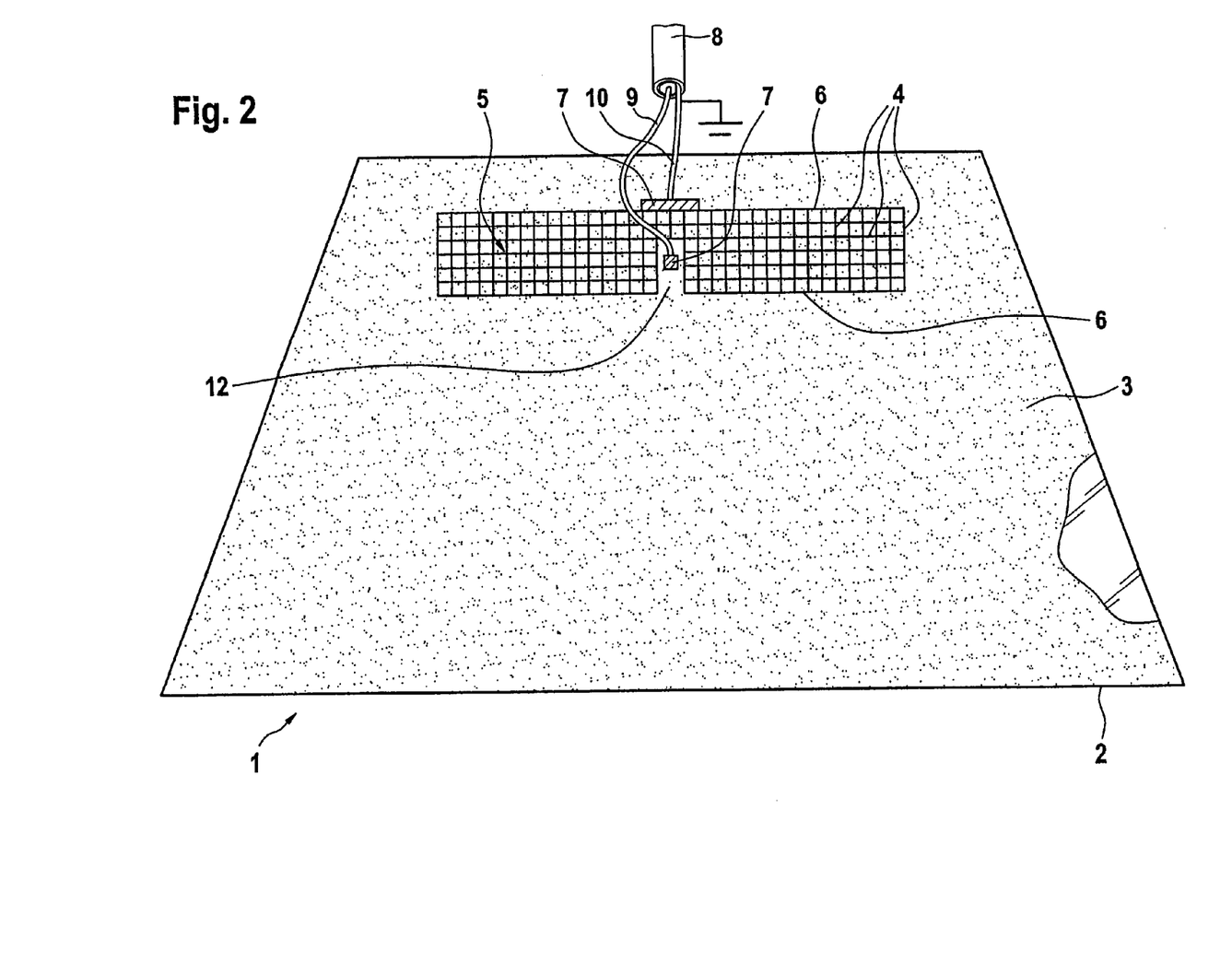
FIGS. 2-10 various embodiments of the invention.

The embodiment of FIG. 2 differs from that of FIG. 1 in that, on the one hand, the uncoated area 11 close to the edge is dispensed with, and, on the other, the segmented surface portion 5 incorporates a constriction 12. This is distinguished by the fact that a slender rectangular portion of the coating 3 extending from the lower longer side 6 of the segmented surface portion 5 towards its upper longer side 6 has no barrier lines 4 running through it and so is not segmented. The constriction 12 also leaves a strip of the segmented surface portion 5 at least about 1 cm wide towards the upper longer side 6 to prevent the slot antenna formed by the segmented surface portion 5 from being short-circuited in the connecting area. The lower contact area 7 can be moved nearer the upper edge 2 of the pane by providing for the constriction 12 and thus, if necessary, be kept out of the vision area of the antenna pane.

Figure 3:
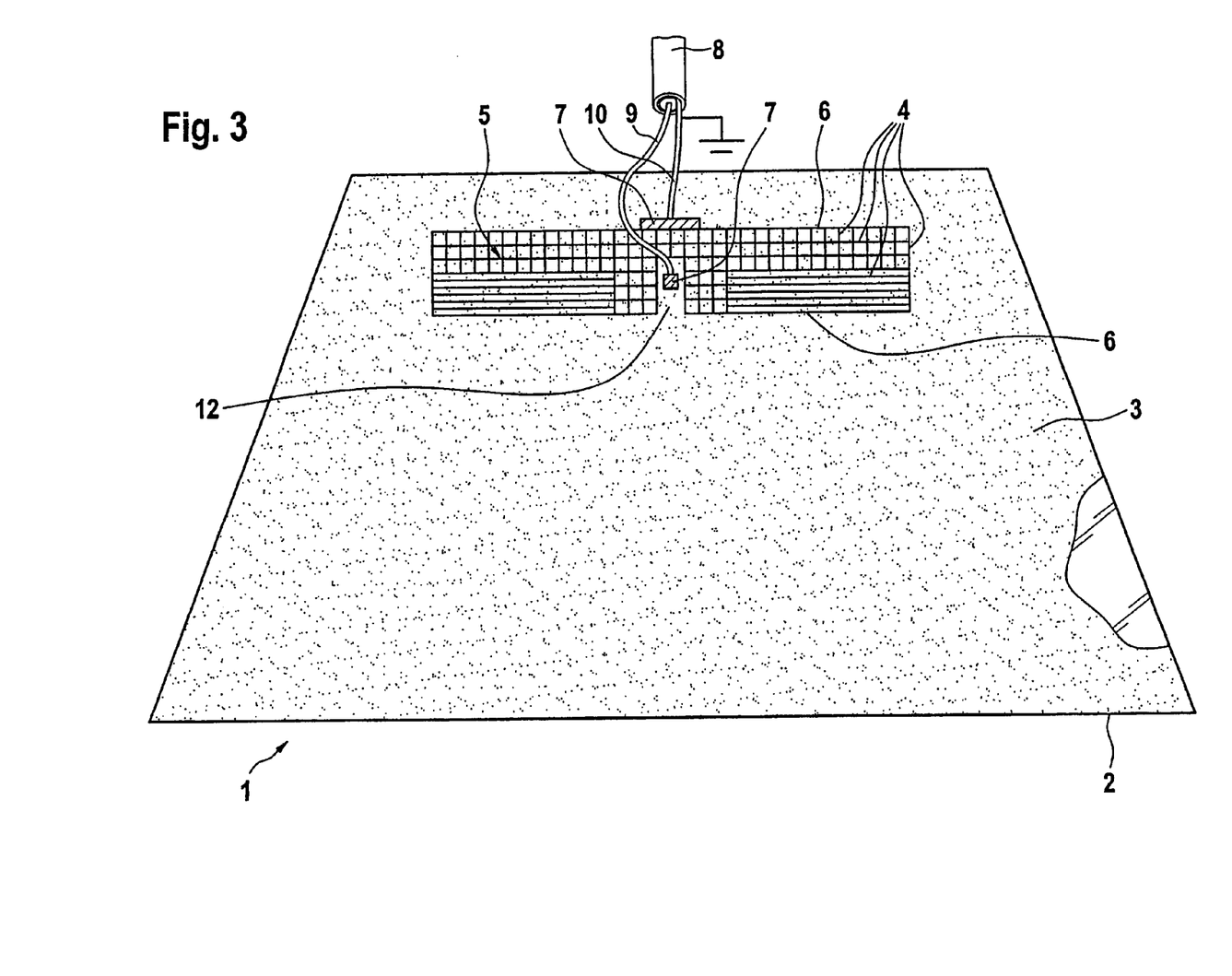

The embodiment of FIG. 3 is a modification of that in accordance with FIG. 2 in that the segmented surface portion 5 incorporates areas with different raster forms. In the two lower outer portions of the segmented surface portion 5 the barrier lines 4 are not arranged as a square raster as in the other areas, but as a horizontal linear raster. Since the slot antenna formed by the segmented surface portion 5 receives vertically (i.e. perpendicularly to the longitudinal extension of the slot antenna) polarised VHF radiation and no interfering electric short-circuiting occurs in the areas concerned, vertical barrier lines 4 can be dispensed with there.

Figure 4:
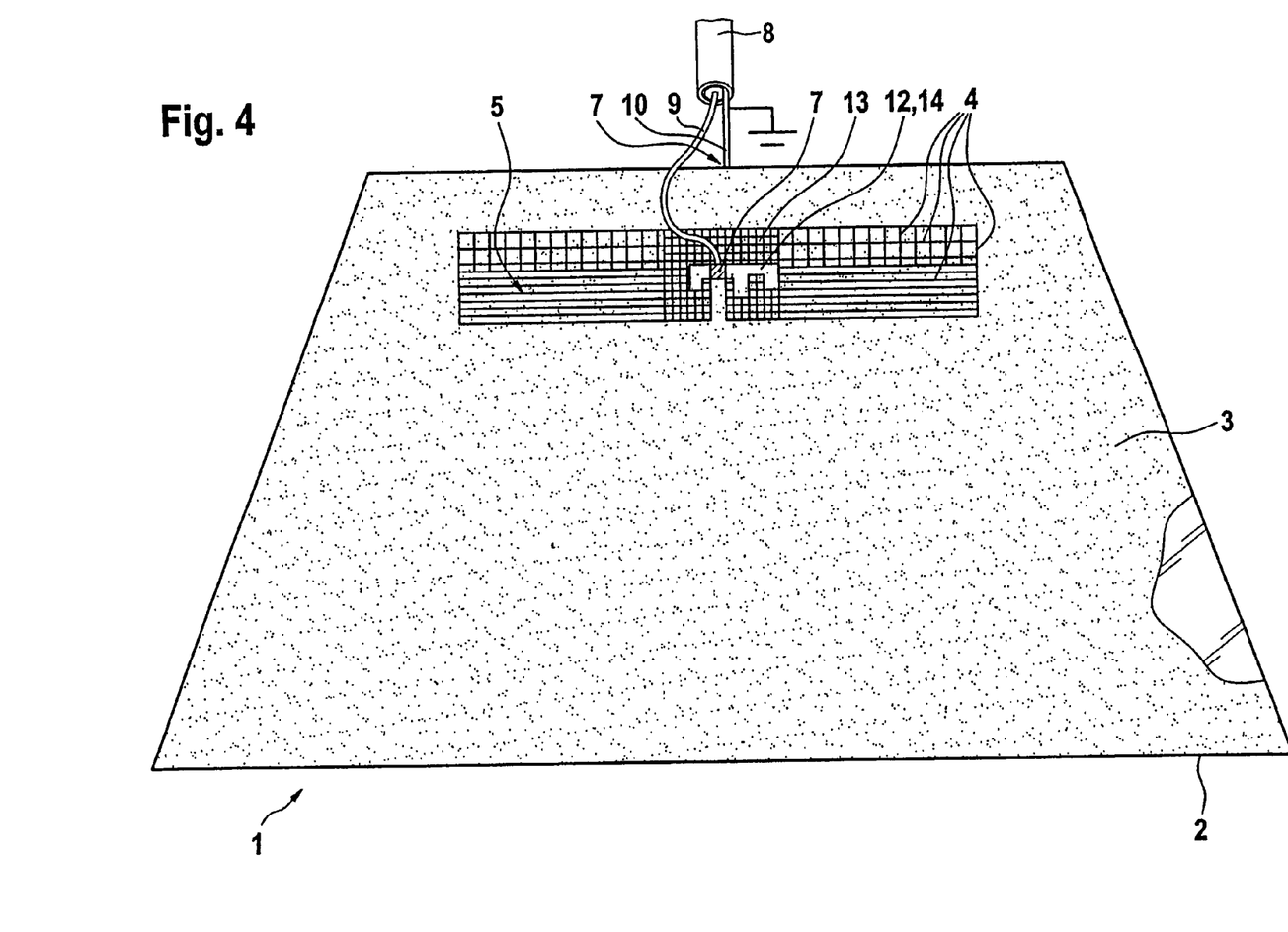

The embodiment of FIG. 4 represents a further development of that in FIG. 3. The segmented surface portion 5 incorporates at its center where the contact areas 7 are arranged a part 13 with a finer raster than in the other areas of the segmented surface portion 5. In contrast to the preceding embodiments, the constriction 12 arranged in this part 13 is not designed merely as a slender shape but as a divided λ/4 monopole for multi-range reception at higher frequencies, e.g. for mobile phone reception. The core 9 of the connecting cable 8 is connected in the lower contact area 7 to the constriction 12, which at the same time forms the aforementioned antenna 14 for higher frequencies, thus enabling the signals of the slot antenna formed from the segmented surface portion 5 and of the antenna 14 integrated into it to be transmitted through the same connecting cable 8. The barrier lines 4 in the part 13 are arranged as a square raster with a raster unit size which is at least about one order of magnitude below the wavelength for which the antenna 14 is designed. In contrast to the preceding embodiments the screening 10 of the connecting cable 8 is not connected directly to the coating 3 adjacent to the segmented surface portion 5 but to the metal bodywork (not shown) at ground potential in immediate proximity to the upper longer side 6 of the segmented surface portion 5, an arrangement which because of the HF coupling of the coating 3 to the bodywork is essentially equivalent to direct contacting of the edge area of the segmented surface portion 5.

Figure 5:
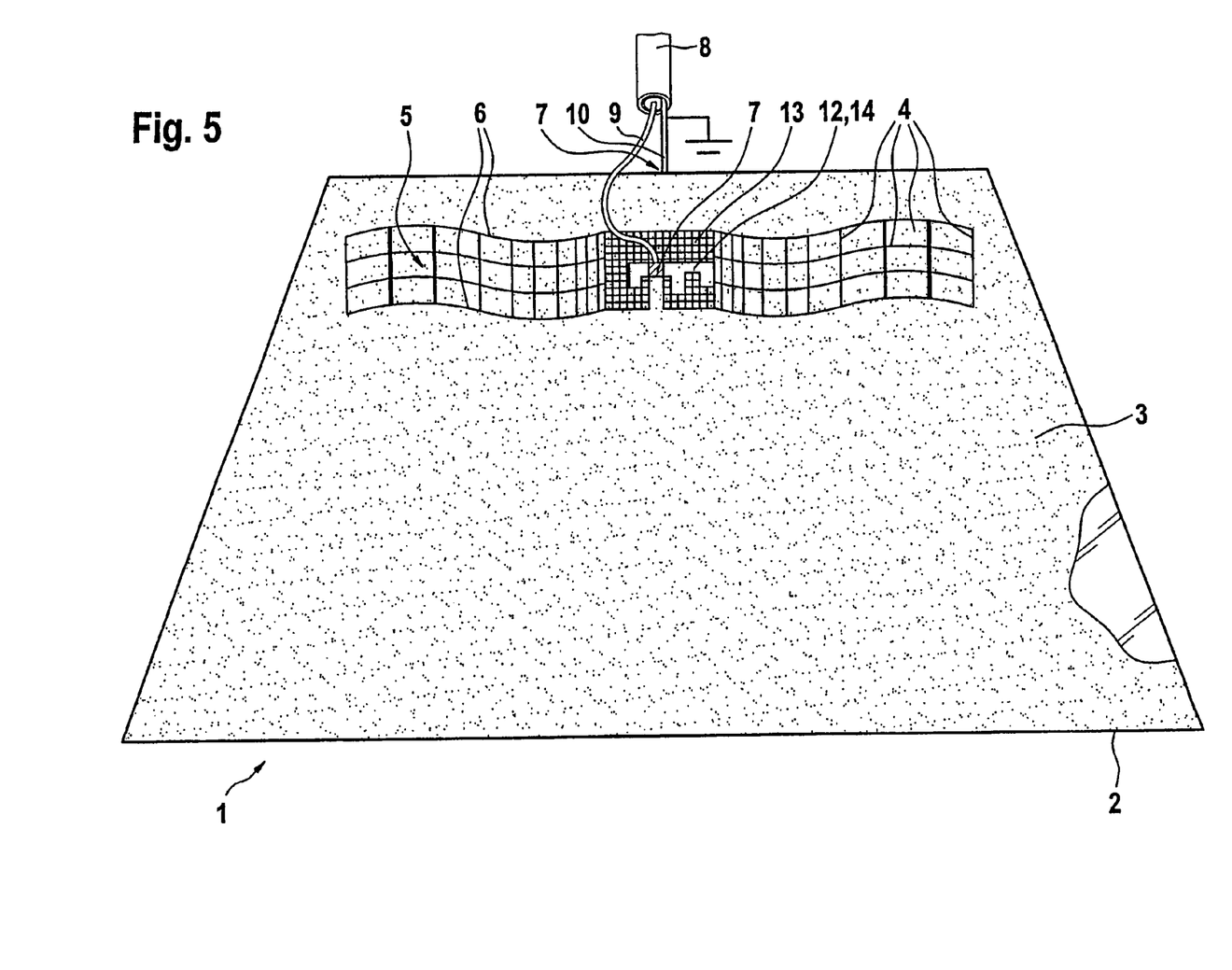

FIG. 5 shows a variant of FIG. 4 where the end areas of the segmented surface portion 5 on both sides of the part 13 are provided with a finer raster with barrier lines 4 forming non-rectilinear boundaries and inside the segmented surface portion 5 with likewise non-rectilinear horizontal barrier lines 4. This enables an increase in the bandwidth of the slot antenna. Moreover, the distance (raster unit size) between and the thickness of the vertical barrier lines 4 increase towards the outside. This enables further optimisation of the antenna function and a reduction in manufacturing costs.

Figure 6:
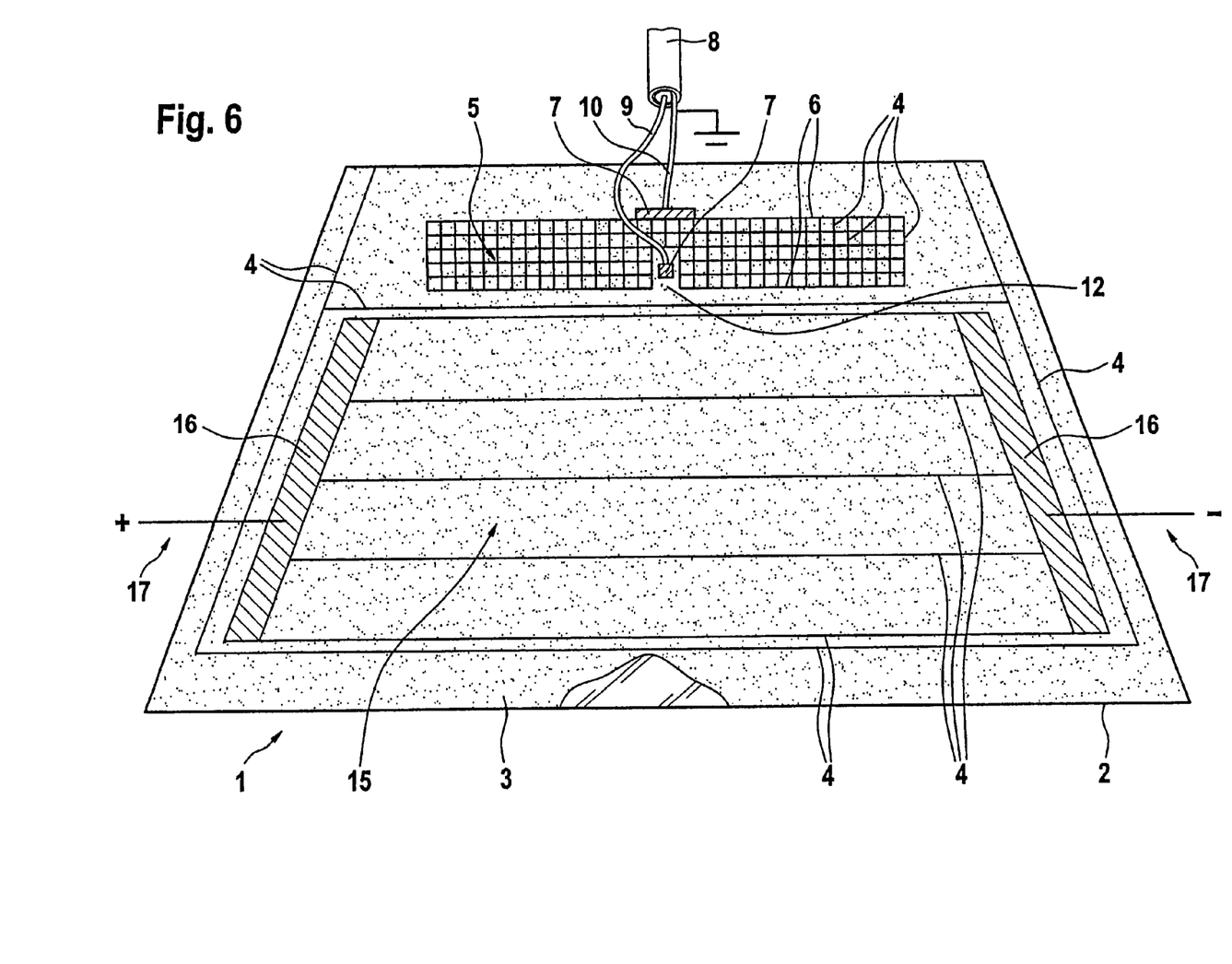

FIG. 6 shows a further development of the embodiment in accordance with FIG. 2. In addition to the segmented surface portion 5 connected as a slot antenna a heatable area 15 which has been produced in a trapezoidal form by generation of barrier lines 4 is provided for in the vision area of the glass pane 1. Arranged on the side edges of the heatable area 15 are highly conductive bus bars 16 which enable an even current supply to the heatable area 15 and to which the—here merely suggested—heating panel connections 17 running to the current source (battery, accumulator, generator, etc.) are connected. Between the bus bars 16 the heatable area 15 is subdivided into horizontal segments by additional straight barrier lines 4 to achieve a homogenisation of the current flow. With this, as with other variants, it is within the scope of the invention to use the heatable area 15, as required, as a VHF/AM antenna by a circuit arrangement which is familiar to the expert and so not represented here.

Figure 7:
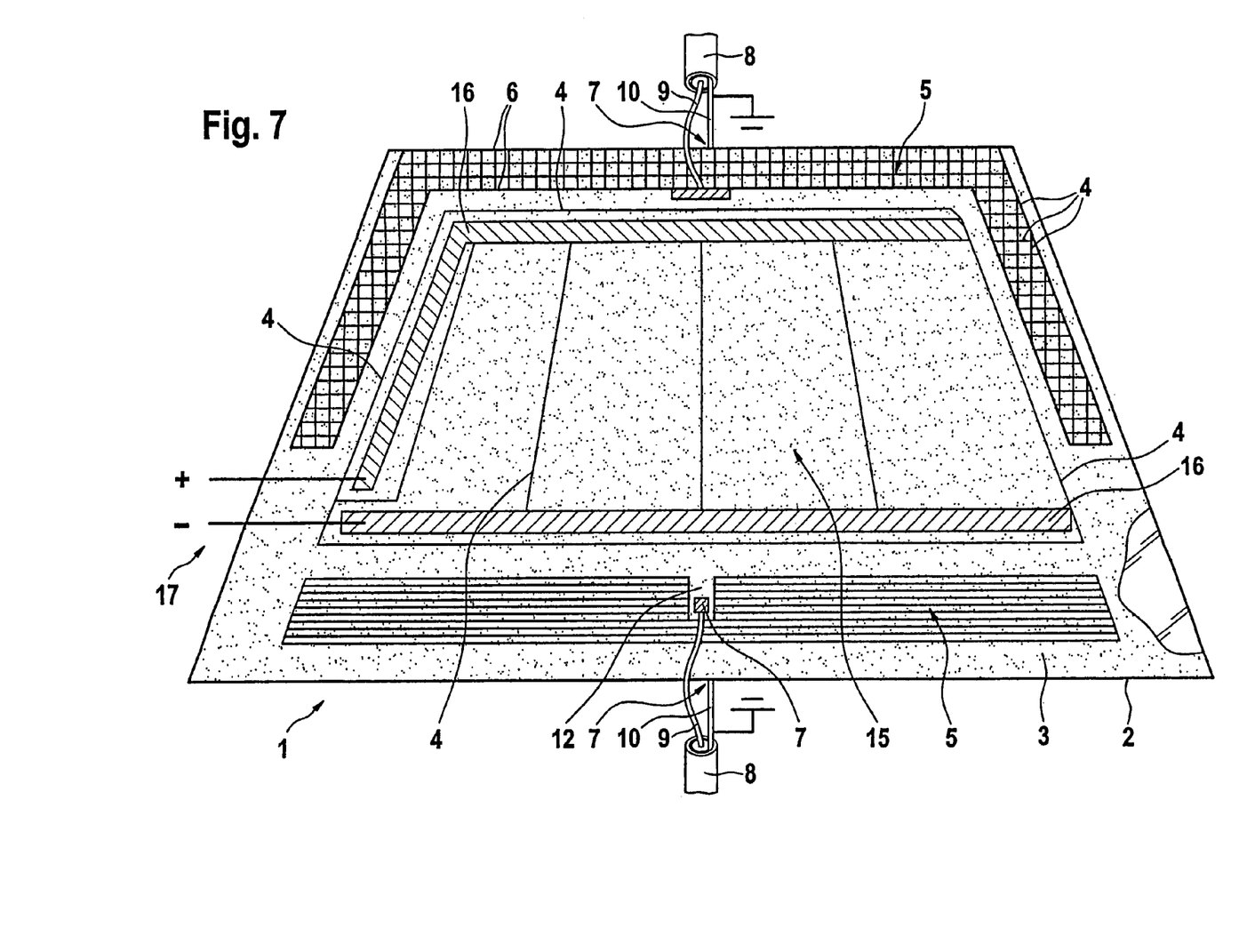

In the case of the embodiment in FIG. 7 two segmented surface portions 5 wired as slot antennas are provided for. The first segmented surface portion 5 extends in an arched form along the upper edge 2 and the left- and right-hand side edges 2 of the pane, while the second is arranged close to the lower edge 2 of the pane. Owing to the different position and form of the two slot antennas they may be used for multi-band reception in the VHF range and for diversity purposes. The first segmented surface portion 5 incorporates a square raster composed of horizontal and vertical barrier lines 4, while the second segmented surface portion 5 is divided up only horizontally by horizontal barrier lines 4. Both slot antennas are—in the case of an almost vertically fitted antenna pane—primarily designed for the reception of vertically polarised VHF radiation, while due to the nearly vertically arranged side portions the slot antenna formed from the first segmented surface portion 5 is also able to receive horizontally polarised VHF radiation.

In the vision area again a trapezoidal heatable area 15 which is generated from the electrically conductive coating 3 with the aid of additional barrier lines 4 running all round is provided for. In contrast to FIG. 6, the bus bars 16 in the represented embodiment are arranged horizontally, the upper bus bar 16 being extended downwards on the left-hand side, thus enabling the heating panel connections 17 to be arranged adjacent to one another. Here, too, between the bus bars 16 the heatable area 15 is subdivided by a few essentially vertically arranged barrier lines 4 into segments which limit the current flow to the segments. The represented barrier lines 4 should be regarded merely as exemplary and explanatory. Other barrier line configurations and, if necessary, total dispensation with segmentation of the heatable area 15 are possible, depending on requirements.

Figure 8:
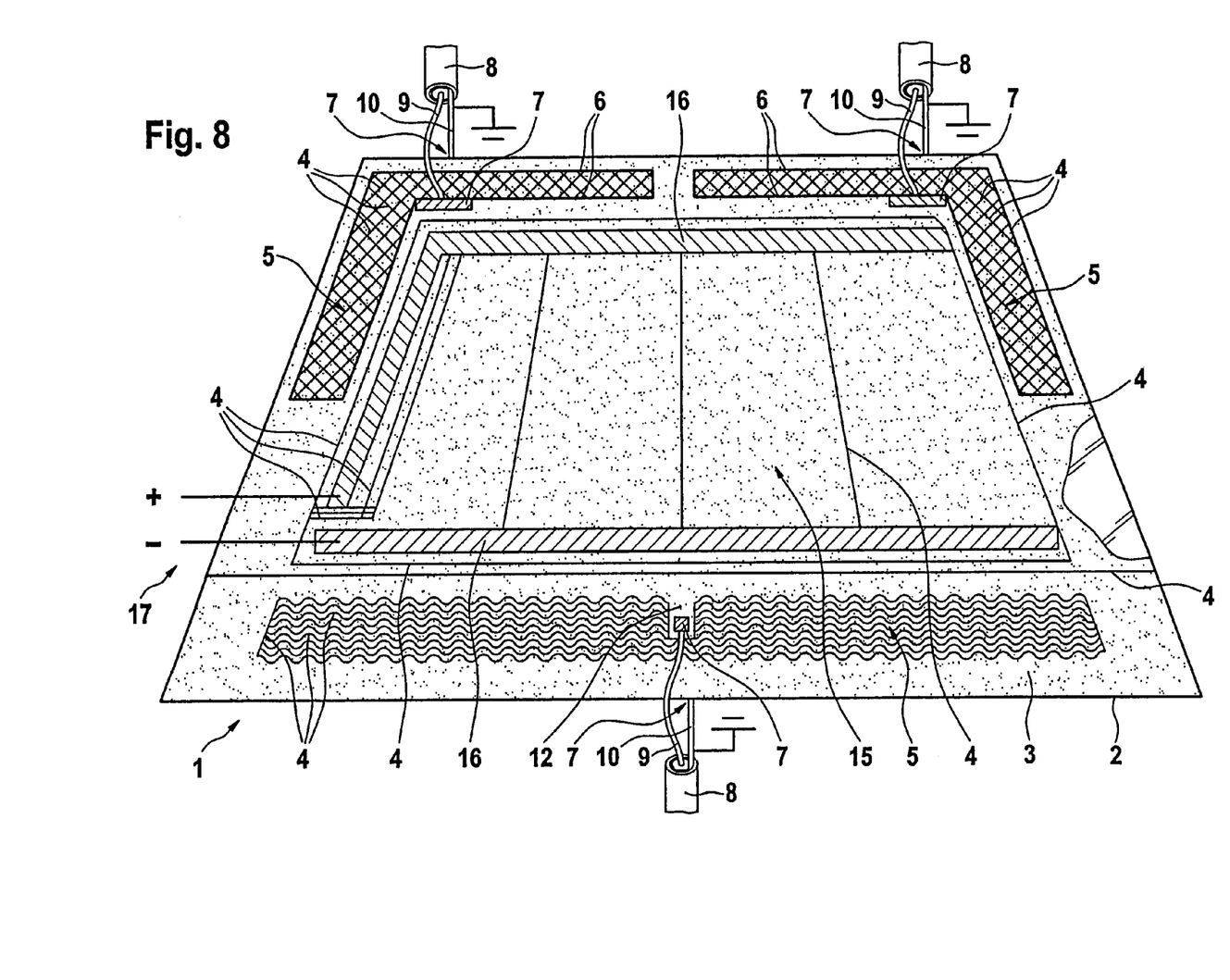

FIG. 8 shows a variant of the embodiment in accordance with FIG. 7 where instead of the arched first segmented surface portion 5 two separate angled segmented surface portions 5 are arranged in the area of the upper left- and right-hand corner of the glass pane 1. The barrier lines 4 run diagonally inside the angled segmented surface portions 5 to form a square raster. This shows that the barrier lines 4 inside the segmented surface portion 5 do not necessarily have to run parallel with the barrier lines 4 forming its boundaries. The slot antennas formed from the two identically dimensioned angled segmented surface portions 5 are especially well suited to diversity reception in the same VHF frequency range.

The lower segmented surface portion 5 wired like the two upper segmented surface portions 5 as a slot antenna and, as in FIG. 7, arranged in the area of the bottom edge 2 of the pane differs from the embodiment in accordance with FIG. 7 in that the horizontal barrier lines 4 inside the segmented surface portion 5 are not straight but undulating, an arrangement which may be desired for optimisation of the antenna function or for improving vision.

In the area of the connecting portion of the upper bus bar 16 arranged on the left-hand side and particularly below its lower end more barrier lines 4 are provided for than on the embodiment in accordance with FIG. 7 in order to provide even greater protection against short-circuiting in the especially critical area of the adjacent ends of the bus bars 16.

Figure 9:
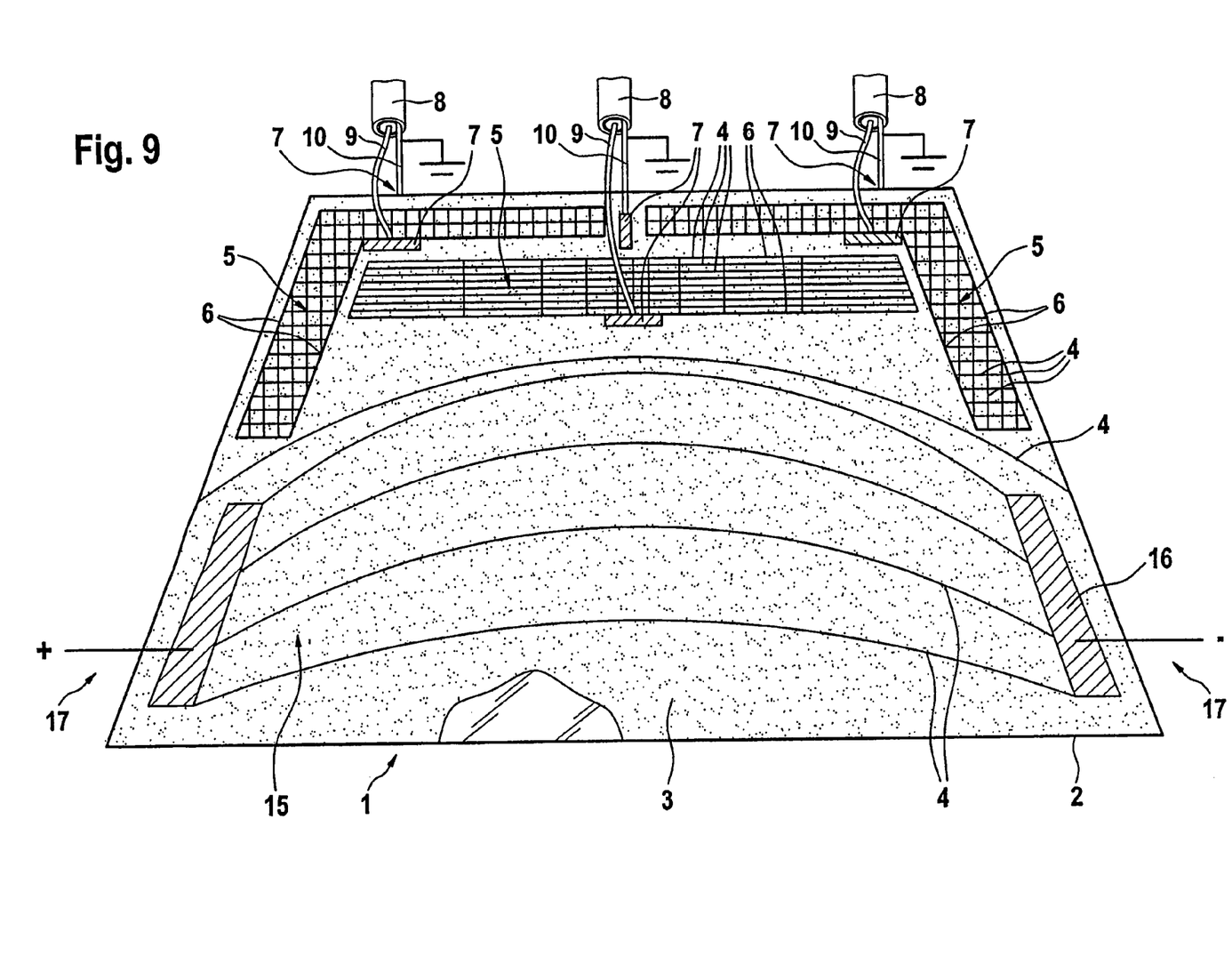

FIG. 9 shows an embodiment with three slot antennas formed from segmented surface portions 5 in the upper third of the pane. Two angled segmented surface portions 5 correspond to those in FIG. 8. Provided for below these is a further horizontal segmented surface portion 5 which is segmented by barrier lines 4 arranged in a horizontal raster and also incorporates some vertical barrier lines 4 the distance between which increases towards the ends of the segmented surface portion 5 without appreciably impairing the effectiveness of the antenna by comparison with a version where the distance between the barrier lines 4 is even and small, as in the center of the pane. Arranged below the three slot antennas is a heatable area 15 which has a form which deviates from the trapezoidal and bulges upwards in the middle. The heatable area 15 is electrically isolated from the three slot antennas at the top by a curved barrier line 4. The barrier lines 4 segmenting the heatable area 15 also have a curved form the radius of which increases from the top down to accurately influence the direction of current flow.

Figure 10:
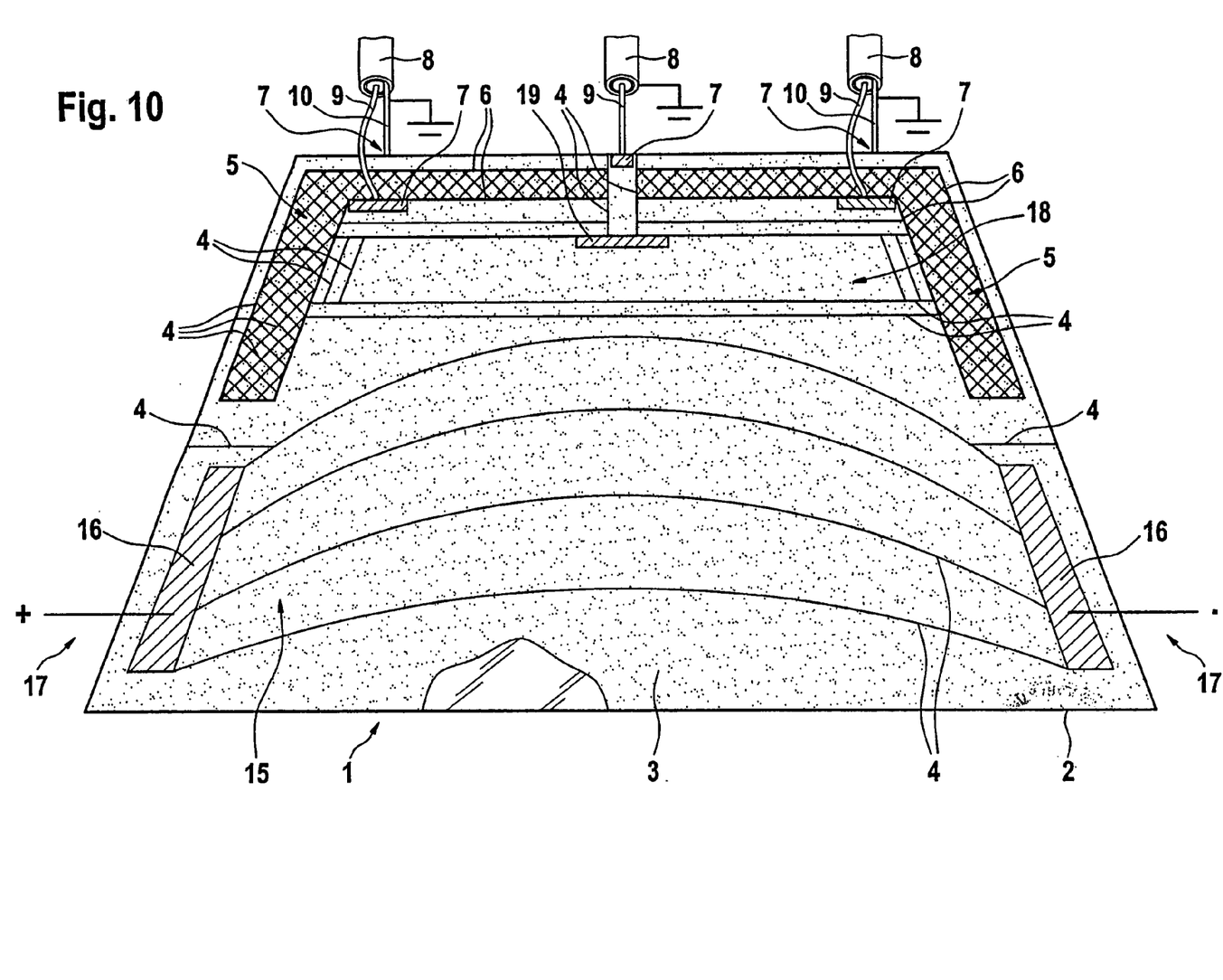

Finally, FIG. 10 shows a variant of FIG. 9 where an AM antenna 18 is provided for in place of the middle slot antenna. The AM antenna 18 is formed of a strip-like, horizontal, unsegmented surface portion of the electrically conductive coating 3 which is electrically isolated all around from the rest of the coating 3 by barrier lines 4. The AM antenna 18 is provided in the middle of its upper longer side with a flat AM antenna connecting area 19, which may be, for example, a capacitive coupling electrode or even an electrical connection. Connected to the AM antenna area 19 is a vertical strip of the coating 3 terminated on the left- and right-hand side by barrier lines 4 and extending as far as the edge 2 of the pane. There a connecting cable 8 by its core 9 is connected electrically to the strip of the coating 3 in a contact area 7 and thereby to the AM antenna connecting area 19. The aforementioned strip of the coating 3 at the same time separates the two angled segmented surface portions 5 which are, as in the preceding diagrams, wired as slot antennas.

The embodiments represented serve merely to explain the teaching of the invention. It goes without saying that the individual elements and features of the antenna panes shown may also be combined and interchanged one with another. Solely embodiments have been shown where the functional structures (transmission lines, heating conductors)—except for connecting elements and bus bars—have been generated from the coating 3 with the aid of barrier lines 4. To avoid impairing the clarity of the drawings, representation of the aforementioned many diverse possibilities within the scope of the invention to implement further functional optimisations by the use of additional conductors or to integrate additional functional elements in the antenna pane have been dispensed with.

The invention claimed is:

1. An antenna pane comprising at least one glass pane and at least one electrically conductive coating which is subdivided by barrier lines into a number of electrically isolated segments, on the antenna pane the coating incorporates at least one strip-like segmented surface portion in which the distance between the barrier lines is so small that the coating there can transmit HF radiation in a specified frequency range, wherein the segmented surface portion is, by contact with a feed line and a ground line in contact areas at its two longitudinal sides and by its outer dimensions, constructed as a slot antenna for electromagnetic radiation in the range of frequencies which the segmented surface portion can transmit.

2. The antenna pane in accordance with claim 1, wherein the barrier lines within the segmented surface portion form a linear or lattice raster with a constant raster unit size.

3. The antenna pane in accordance with claim 1, wherein the barrier lines within the segmented surface portion form a raster with a variable raster unit size, variable barrier line width or variable raster form.

4. The antenna pane in accordance with claim 1, wherein the barrier lines within the segmented surface portion have at least partly a non-rectilinear form.

5. The antenna pane in accordance with claim 1, wherein the segmented surface portion is constructed as a slot antenna for VHF range.

6. The antenna pane in accordance with claim 5, wherein in a part of the segmented surface portion a raster which can transmit frequencies above the VHF range and is finer than in other areas of the segmented surface portion is provided and in that at least one antenna for frequencies above the VHF range is arranged in this part.

7. The antenna pane in accordance with claim 1, wherein the segmented surface portion in an area in which it is contacted as a slot antenna incorporates a constriction which reduces a width of the segmented surface portion.

8. The antenna pane in accordance with claim 7, wherein the constriction comprises a strip-like portion of the coating, the strip-like portion projects into the segmented surface portion and is constructed as an antenna for a frequency range above a reception range of the slot antenna.

9. The antenna pane in accordance with claim 1, wherein the barrier lines are first barrier lines, and wherein the coating incorporates a heatable area electrically isolated from an area of the coating adjacent to the segmented surface portion by at least one second barrier line and provided with bus bars.

10. The antenna pane in accordance with claim 9, wherein the heatable area is provided with at least some of the second barrier lines influencing distribution of heating current.

11. The antenna pane in accordance with claim 9, wherein the heatable area is wired as an antenna for VHF and/or AM range.

12. The antenna pane in accordance with claim 1, wherein in the coating an AM antenna bounded by at least some of the barrier lines and with an assigned AM antenna connecting area is provided.

13. The antenna pane in accordance with claim 1, wherein the segmented surface portion is surrounded on all sides by the electrically conductive coating.

14. The antenna pane in accordance with claim 4, wherein the non-rectilinear form is one of an undulating, curved, zigzagged and fractal form.

15. The antenna pane in accordance with claim 2, wherein the barrier lines within the segmented surface portion have at least partly a non-rectilinear form.

16. The antenna pane in accordance with claim 2, wherein the segmented surface portion is constructed as a slot antenna for VHF range.

17. The antenna pane in accordance with claim 2, wherein the segmented surface portion in an area in which it is contacted as a slot antenna incorporates a constriction which reduces a width of the segmented surface portion.

18. The antenna pane in accordance with claim 2, wherein the coating incorporates a heatable area electrically isolated from an area of the coating adjacent to the segmented surface portion by at least one of the barrier lines and provided with bus bars.

19. The antenna pane in accordance with claim 2, including an AM antenna provided in the coating and bounded by the barrier lines, the AM antenna comprising an assigned AM antenna connecting area.

20. The antenna pane in accordance with claim 2, wherein the segmented surface portion is surrounded on all sides by the electrically conductive coating.

* * * * *